(12) United States Patent
Kim (10) Patent No.: US 11,983,766 B2
(45) Date of Patent: May 14, 2024

(54) DEBT MANAGEMENT CAPABILITY ASSESSMENT SYSTEM AND METHOD OF ANALYZING DEBT MANAGEMENT CAPABILITY INFORMATION USING THE SAME

(71) Applicant: AJOU UNIVERSITY INDUSTRY-ACADEMIC COOPERATION FOUNDATION, Suwon-si (KR)

(72) Inventor: Do Yeong Kim, Suwon-si (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 345 days.

(21) Appl. No.: 17/132,705

(22) Filed: Dec. 23, 2020

(65) Prior Publication Data
US 2021/0241367 A1 Aug. 5, 2021

(30) Foreign Application Priority Data
Jan. 30, 2020 (KR) .................. 10-2020-0011130

(51) Int. Cl.
*G06Q 40/02* (2023.01)
*G06F 17/18* (2006.01)
*G06F 18/23* (2023.01)

(52) U.S. Cl.
CPC ............ *G06Q 40/02* (2013.01); *G06F 17/18* (2013.01); *G06F 18/23* (2023.01)

(58) Field of Classification Search
CPC .......... G06Q 40/02; G06K 9/62; G06F 17/18
See application file for complete search history.

(56) References Cited

U.S. PATENT DOCUMENTS

| 2018/0204479 A1* | 7/2018 | Kim ..................... G09B 7/02 |
| 2019/0213660 A1* | 7/2019 | Astrada ............... G06Q 40/02 |
| 2020/0372371 A1* | 11/2020 | Sabanayagam ....... G06N 3/082 |

FOREIGN PATENT DOCUMENTS

| CN | 107851283 | * | 3/2018 | ............ G06Q 40/06 |
| JP | 2000113157 A | | 4/2000 | |

(Continued)

OTHER PUBLICATIONS

Communication dated May 20, 2021 from the Korean Intellectual Property office in application No. 10-2020-0011130.

(Continued)

*Primary Examiner* — Scott S Trotter
(74) *Attorney, Agent, or Firm* — Sughrue Mion, PLLC (57) ABSTRACT

A method of analyzing debt management capability information by a computing device working with a plurality of user equipments (UEs) and operating under the control of at least one processor includes receiving debt repayment information for each round from the plurality of UEs according to a debt assessment scenario set up with a plurality of rounds. The method further includes determining a number of groups into which users of the plurality of UEs are to be grouped, based on the debt repayment information, grouping the users into as many groups as the number of groups created based on the debt repayment information, and deriving characteristics of each of the groups according to debt management capability characteristics of the users.

11 Claims, 7 Drawing Sheets

(56) References Cited

FOREIGN PATENT DOCUMENTS

| KR | 101248156 B1 | 3/2013 |
| KR | 1020190013017 A | 2/2019 |
| KR | 10-1979427 B1 | 5/2019 |

OTHER PUBLICATIONS

Motley Quest—Charm Study GodGo: Naver Blog, https://blog.naver.com/samsung/2210127639342, May 30, 2017 (8 pages total).

* cited by examiner

① ACTIVATION  [1]

② SCENARIO NAME

③ DEBT DISPLAY OPTION
- ☐ Normal
- ▨ Prospective
- ☐ Retrospective
- ☐ Retroprospective

④ MAX. ROUND       25

⑤ BONUS ROUND     6, 12, 19

⑥ BONUS MONEY     2000, 15000, 40000

⑦ SAVING MODE

⑧ LAPSED TIME INDICATION

FIG. 2B

| DEBT NAME | INITIAL DEBT AMOUNT | INTEREST RATE |
|---|---|---|
| A | 3000,00 | 2.50 |
| B | 8000,00 | 2.00 |
| C | 11000,00 | 3.50 |
| D | 13000,00 | 3.25 |
| E | 52000,00 | 3.75 |
| F | 60000,00 | 4.00 |

| | |
|---|---|
| INITIAL ASSEST | 5000 |
| FIXED INCOME | 5000 |
| CURRENCY SIGN | $   ☐ FRONT  ▨ BACK |
| PRE-QUESTIONNAIRE URL | |
| POST-QUESTIONNAIRE URL | |

| INDIVIDUAL PARTICIPANT NUMBER | (GROUP(0~8)) | Final_Total_Debt | Final_Total_Debt_Min_by_Cluser | Final_Total_Debt_Max_by_Cluser |
|---|---|---|---|---|
| 0 | 7 | 36695.4 | -51896.48 | 50099.25 |
| 1 | 8 | 27325.25 | 22863.62 | 28047.71 |
| 2 | 1 | 24472.3 | -58883.08 | 47149.66 |
| 3 | 2 | 33248.5 | 29843.28 | 40679.99 |
| 4 | 8 | 23998.93 | 22863.62 | 28047.71 |
| 5 | 3 | 83135.48 | 79441.45 | 108488.78 |
| 6 | 1 | 47149.66 | -58883.08 | 47149.66 |
| 7 | 7 | 41504.3 | -51896.48 | 50099.25 |
| 8 | 5 | 28527.8 | 23364.25 | 101395.81 |
| 9 | 8 | 27123.27 | 22863.62 | 28047.71 |
| 10 | 7 | 50099.25 | -51896.48 | 50099.25 |
| 11 | 1 | 25780.55 | -58883.08 | 47149.66 |
| 12 | 5 | 28851.63 | 23364.25 | 101395.81 |
| 13 | 0 | 51846.55 | 12082.46 | 109567.23 |
| 14 | 7 | 39542.71 | -51896.48 | 50099.25 |
| 15 | 2 | 39162.03 | 29843.28 | 40679.99 |

FIG. 6

| VARIABLE PRIORITY | variable_name | stat | p-value |
|---|---|---|---|
| 0 | NOAM_VALUE_R18 | 0.843373494 | 4.99395E-10 |
| 1 | SAVING_TOTAL_AMOUNT | 0.843373494 | 4.99395E-10 |
| 2 | NOAM_VALUE_R17 | 0.819277108 | 2.32311E-09 |
| 3 | SAVING_R18 | 0.807228916 | 4.798E-09 |
| 4 | SAVING_R17 | 0.807228916 | 4.798E-09 |
| 5 | CASH_AVAILABLE_R18 | 0.807228916 | 4.798E-09 |
| 6 | CASH_AVAILABLE_R19 | 0.807228916 | 4.798E-09 |
| 7 | SAVING_R12 | 0.795180723 | 9.6582E-09 |
| 8 | CASH_AVAILABLE_R13 | 0.795180723 | 9.6582E-09 |
| 9 | NOAM_VALUE_R11 | 0.78875502 | 1.39253E-08 |
| 10 | NOAM_VALUE_R10 | 0.776706827 | 2.77311E-08 |
| 11 | SAVING_R22 | 0.771084337 | 3.65329E-08 |
| 12 | CASH_AVAILABLE_R23 | 0.771084337 | 3.65329E-08 |
| 13 | SAVING_R8 | 0.764658635 | 5.38372E-08 |
| 14 | CASH_AVAILABLE_R9 | 0764658635 | 5.38372E-08 |
| 15 | NOAM_AVG(ARIT-MEAN) | 0.759036145 | 6.89063E-08 |
| 16 | CASH_AVAILABLE_R22 | 0.759036145 | 689063E-08 |
| ⋮ | ⋮ | ⋮ | ⋮ |
| 98 | FINAL_BALANCE_D | 0.391164659 | 0.028328097 |
| 99 | CLOSE_D | 0.391164659 | 0.028328097 |
| 100 | NAAM_R4 | 0.391164659 | 0.028328097 |
| 101 | NOAM_VALUE_R3 | 0.383935743 | 0.034292175 |
| 102 | FINAL_BALANCE_F | 0.37751004 | 0.039484365 |
| 103 | SAVING_R25 | 0.371084337 | 0.045272195 |

FIG. 7

DEBT MANAGEMENT CAPABILITY ASSESSMENT SYSTEM AND METHOD OF ANALYZING DEBT MANAGEMENT CAPABILITY INFORMATION USING THE SAME

CROSS-REFERENCE TO RELATED APPLICATION

This application claims the benefit of Korean Patent Application No. 10-2020-0011130, filed on Jan. 30, 2020, in the Korean Intellectual Property Office, the disclosures of which are incorporated herein in its entirety by reference.

BACKGROUND

1. Field

The disclosure relates to a debt management capability assessment system and method of analyzing debt management capability information using the debt management capability assessment system.

2. Description of the Related Art

Household debt has emerged as social and economical problems since 2000. Despite this, the nation's debt management education system has not yet provided individuals with sufficient educational contents about debt management, nor established a relevant technical system.

Hence, people in the nation have little education about the debt management and repayment. Furthermore, the existing education about the debt management has only given a theoretical overview of how to manage a debt, but failed to provide a debt management method taking into account an individual's specific circumstances.

SUMMARY

The disclosure provides a debt management capability assessment system and method of analyzing debt management capability information using the debt management capability assessment system, by which to find out unique debt management capability characteristics of users belonging to the same group once users are grouped based on artificial intelligence (AI) through debt management capability standard assessment, and reinforce a personalized debt management capability based on the unique debt management capability characteristics. The disclosure also provides a debt management capability assessment system that gives debt management reinforcing feedback based on user characteristics.

According to an aspect of the disclosure, a method of analyzing debt management capability information by a computing device working with a plurality of user equipments (UEs) and operating under the control of at least one processor, the method comprising: receiving debt repayment information for each round from the plurality of UEs according to a debt assessment scenario set up with a plurality of rounds; determining a number of groups into which users of the plurality of UEs are to be grouped, based on the debt repayment information; grouping the users into as many groups as the number of groups created based on the debt repayment information; and deriving characteristics of each of the groups according to debt management capability characteristics of the users.

According to an exemplary embodiment, the deriving of the characteristics of each group comprises sorting out first debt repayment information of users forming a target group, which is one of the groups, and second debt repayment information of users forming a comparative group, which corresponds to the other groups than the target group, performing a test algorithm for each of a plurality of variables included in each of the first debt repayment information and second debt repayment information, and extracting a statistical value of a particular one of the plurality of variables.

According to an exemplary embodiment, the extracting of the statistical value comprises determining a difference in distribution based on a histogram, and deriving characteristics of each group based on the extracted statistical value of the particular variable.

According to an exemplary embodiment, the test algorithm comprises the Kolmogorov-Smirnov test algorithm.

According to an exemplary embodiment, each debt repayment information comprises user identification information, debt identification information, debt information for each round, interest rate information for each debt, final balance information for each debt, final balance information for each debt at the end of a round, a final interest rate, and variables which are debt capacity assessment scores, and the determining of the number of groups comprises extracting object information to be analyzed from the debt repayment information, and determining the number of groups by clustering the extracted object information to be analyzed.

According to an exemplary embodiment, the determining of the number of groups comprises determining the number of groups using the elbow method algorithm which looks for the number of clusters.

According to an exemplary embodiment, the grouping comprises grouping the users into at least one group using a plurality of grouping algorithms, and analyzing grouping performance, and based on the analyzed performance, selecting one of the plurality of grouping algorithms as an algorithm for grouping, wherein the plurality of grouping algorithms include a hierarchical cluster analysis algorithm, a K-means cluster analysis algorithm, or a dbscan algorithm, and the grouping performance is analyzed based on silhouette scores.

According to an aspect of the disclosure, a debt management capability assessment system comprises a communication interface receiving debt repayment information for each round from user equipments (UEs) participating in a debt assessment scenario, and at least one processor is configured to determine a number of groups into which users of the UEs are to be grouped, based on the debt repayment information, group the users into as many groups as the number of groups created based on the debt repayment information, and derive characteristics of each of the groups according to debt management capability characteristics of the users.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Embodiments of the disclosure will now be described in detail with reference to accompanying drawings to be readily practiced by those of ordinary skill in the art. However, the embodiments of the disclosure may be implemented in many different forms, and not limited thereto as will be discussed herein. In the drawings, parts unrelated to the description are omitted for clarity, and like numerals refer to like elements throughout the specification.

The term "include (or including)" or "comprise (or comprising)" is inclusive or open-ended and does not exclude additional, unrecited elements or method steps.

A debt management capability assessment system and debt management capability education method using the system will now be described with reference to the accompanying drawings.

Figure 1:
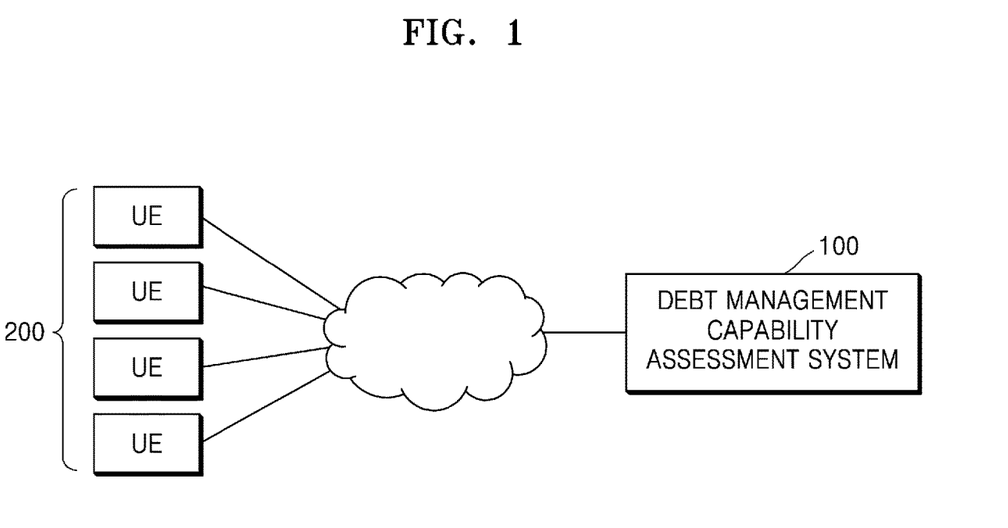
FIG. 1 illustrates an environment to which a debt management capability assessment system is applied, according to an embodiment of the disclosure.

FIG. 1 illustrates an environment, to which a debt management capability assessment system is applied, according to an embodiment of the disclosure.

Referring to FIG. 1, a debt management capability assessment system 100 is connected to a plurality of user equipments (UEs) 200 over a communication network. The communication network enables information to be transmitted or received between the UEs 200 and the debt management capability assessment system 100 through wired or wireless communication using various communication protocols, which are not limited to a particular one.

The debt management capability assessment system 100 provides debt management capability level test content (hereinafter, referred to as 'test content' for convenience of explanation) to test users' debt management capability levels. The debt management capability assessment system 100 collects response information to the debt management capability level test performed by the users through their UEs 200, and classifies the users into groups or clusters.

For example, the test content provided by the debt management capability assessment system 100 for the UE 200 may be standardized test content including a contents list (e.g., debt information, income information, test round information, etc.) defined in advance to assess the user's debt management capability. Alternatively, user-specific test content may be provided.

It is assumed that the debt management capability assessment system 100 has been trained beforehand based on the response information of the users classified into groups, to classify users tested for their debt management capability levels into the groups.

In the conventional system, specific characteristics of users belonging to a group cannot be identified, because the system administrator has passively classify the users into the group or only final information classified into the group is provided by an artificial intelligence (AI). On the contrary, according to the embodiment of the disclosure, the debt management capability assessment system 100 may find out specific characteristics of a debt group based on the response information, and find and provide factors that give positive or negative influences to the debt management capability.

For this, the debt management capability assessment system 100 pre-processes the collected response information to extract relevant information required for debt clustering (hereinafter, referred to as object information to be analyzed). Pre-processing of the response information by the debt management capability assessment system 100 may involve grouping variable data of the respective users using a clustering algorithm and extracting an important variable from each group. The debt management capability assessment system 100 finds out characteristics of users belonging to the same group based on the extracted object information to be analyzed.

An example of assessment contents provided by the debt management capability assessment system 100 to collect the response information will now be described in connection with FIGS. 2A and 2B.

Figure 2A:
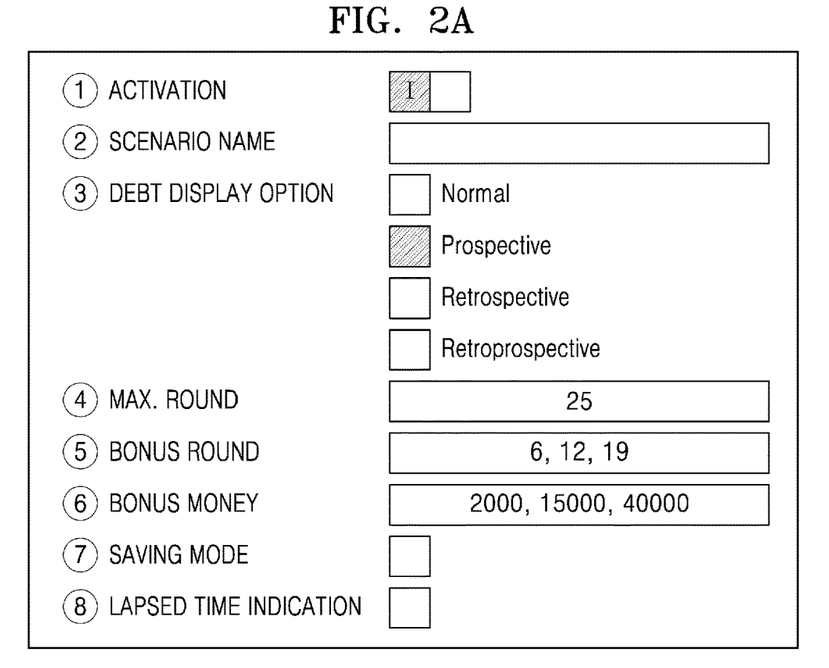
FIGS. 2A and 2B illustrate debt management capability assessment, according to an embodiment of the disclosure.
Figure 2B:
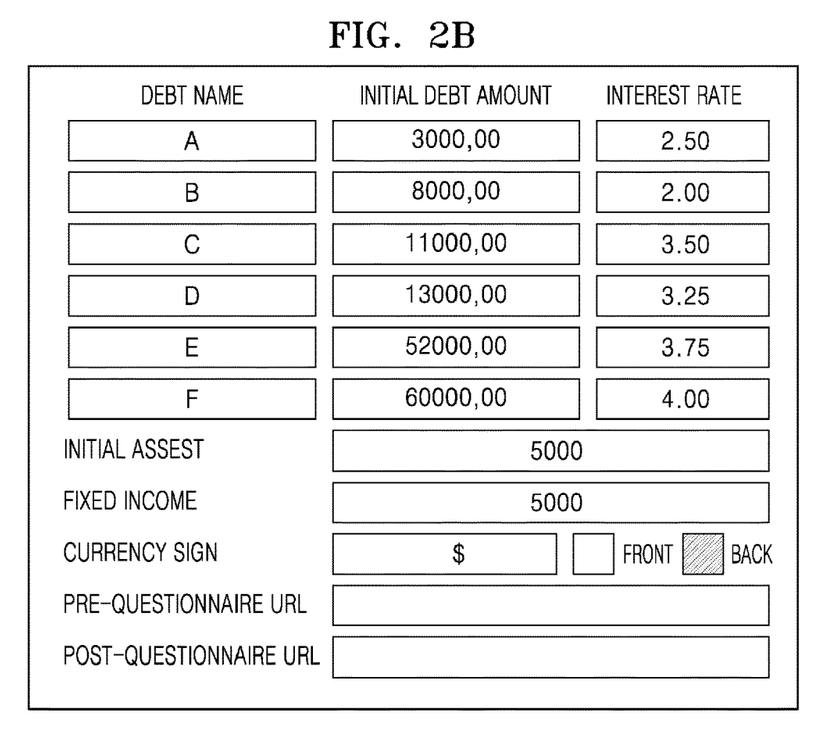

FIGS. 2A and 2B illustrate debt management capability assessment, according to an embodiment of the disclosure.

Referring to FIGS. 2A and 2B, the debt management capability assessment system 100 may provide a user with a debt management capability assessment screen through the user's UE 200, the debt management capability assessment screen having an activation/deactivation indication window ①, a scenario name window ②, debt display option check boxes ③, a maximum round setting window ④, a bonus round setting window ⑤, a bonus money entry window ⑥, a saving mode selection window ⑦, and a lapsed time indication window ⑧.

The debt display option check boxes ③ may include a first display mode, e.g., normal mode, a second display mode, e.g., retrospective mode, a third display mode, e.g., prospective mode, and a fourth display mode, e.g., retroprospective mode.

When the user selects the first display mode, the debt management capability assessment system 100 provides principals and interest rates of a plurality of debts in the current round. When the user selects the second display mode, the debt management capability assessment system 100 provides an interest amount accumulated from the first round to a round right before the current round for each of the plurality of debts.

When the user selects the third display mode, the debt management capability assessment system 100 provides an interest amount on each of the plurality of debts in a round right after the current round. When the user selects the fourth display mode, the debt management capability assessment system 100 provides a combination of all the information provided for the user in the first to third modes. Past, current, and future interest information provided for the user through the debt display option gives the user a hint in making a decision.

Information about a round indicates the number of rounds, and the user may set a maximum round by entering the maximum round for test to the maximum round setting window ④. Rounds proceed one way and are not circulated. Specifically, the current round, e.g., round n, proceeds to the next round, e.g., round n+1, and is unable to proceed back to the previous round, e.g., round n−1.

The user may make a decision once in every round. A round in a scenario may correspond to a year in reality, to figure out the user's tendency to pay debts every year.

Furthermore, the user may further provide at least one of his/her profile information (not shown), bonus money, saving information, lapsed time, and initial asset information through a debt management assessment scenario. The user's profile information may include at least one of nationality, sex, age, occupation, and specialty.

Information about a plurality of debts may include identification information (DEBT NAME), a principal of initial debt (INITIAL DEBT AMOUNT), and an interest rate (INTEREST RATE) on each of the plurality of debts. At least two of the plurality of debts may have at least one of different principals and interest rates. This may enable the user's tendency to make a decision about payment of multiple debts with different principals to be figured out.

Information about an income may include information about cash paid for each round. At least one of the interest rates on the plurality of debts and the income may be set to be variable in at least one of the rounds. With these settings, the degree of difficulty of the scenario may be changed. By making various scenarios, a decision-making tendency of an individual or a group may be correctly determined.

When each user takes the aforementioned test by entering information for the test, the debt management capability assessment system 100 classifies a plurality of users into groups based on the information entered by the users. In this regard, how the debt management capability assessment system 100 finds out grouping characteristics based on the information entered in the test by the users classified into groups will now be described in connection with FIG. 3.

Figure 3:
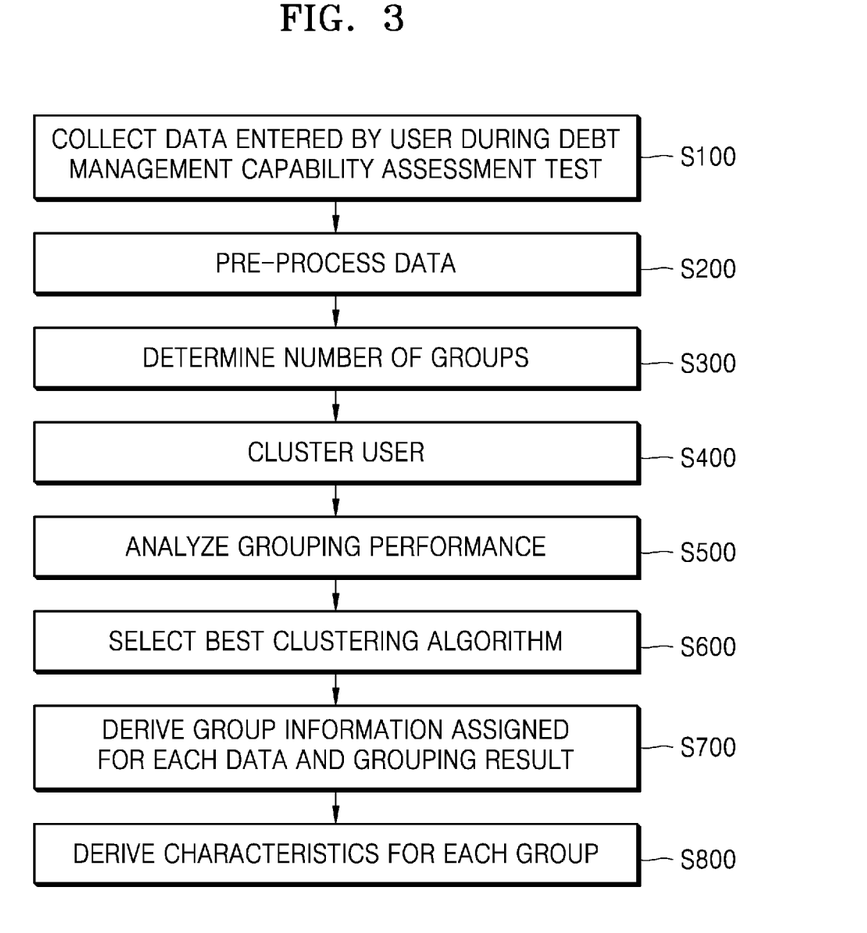
FIG. 3 is a flowchart illustrating a method of analyzing debt management capability information, according to an embodiment of the disclosure.

FIG. 3 is a flowchart illustrating a method of analyzing debt management capability information, according to an embodiment of the disclosure.

Referring to FIG. 3, when a user takes a debt management capability assessment test, the debt management capability assessment system 100 collects data, i.e., debt repayment information, entered by the user, in operation S100. The data entered may include user identification information, debt identification information, final debt balance information for each debt, interest rate information for each debt, a final debt adjusted amount, a total debt balance obtained by combining amounts of remaining debts in the respective accounts, a debt payment ability assessment score, etc.

In the embodiment of the disclosure, an occasion when 126 pieces of input data are collected based on information entered by a single user is taken as an example.

The debt management capability assessment system 100 pre-processes the data collected in the operation S100, and extracts information required to classify users into groups (hereinafter, referred to as 'object information to be analyzed'), in operation S200. The object information to be analyzed includes 126 pieces of input data. There are various ways that the debt management capability assessment system 100 pre-processes the data, without being limited to a particular one.

The debt management capability assessment system 100 determines the number of groups by clustering the object information to be analyzed, i.e., object information to be analyzed based on individuals' debt management characteristics, according to an AI algorithm optimized for data, in operation S300. The debt management capability assessment system 100 may use various algorithms to group users, and in the embodiment of the disclosure, it is assumed that an algorithm of the elbow method is used.

The elbow method is an assessment method of looking for the optimal number of clusters, which determines the number of clusters as the number of groups. Specifically, in the elbow method, results of a cost function are sequentially monitored by successively increasing the number of groups, to find an optimal point to be taken as the number of groups.

The cost function produces a sum of distances from a center of each group to respective points. As the number of groups increases, the cost function is reduced, and a point at which the reduction decreases drastically is determined as the optimal number of groups. The elbow method is a technique already known as assessing performance of grouping results, so a detailed description thereof will be omitted.

The debt management capability assessment system 100 groups users based on the number of groups determined in the operation S300 in operation S400, and analyses performance of the grouping result in operation S500. For example, the debt management capability assessment system 100 uses various algorithms such as a hierarchical cluster analysis algorithm, a K-means algorithm, a dbscan algorithm, etc., to perform grouping of users, select an optimal cluster analysis algorithm based on performance analysis on the clustering result, and cluster or group users with the selected algorithm.

The hierarchical cluster analysis algorithm is an approach to build a single final group by starting from a single object and re-grouping objects or clusters around the single object. For data sets having hierarchical relations between layers or organizations, a state of the hierarchy vertically divided may be seen, and how data sets are merged in each step is shown using a tree-shaped dendrogram.

The K-means algorithm is an approach to classify given data pints into K clusters, which builds a group in a way of minimizing within-cluster variances.

The dbscan algorithm is one of density-based clustering algorithms, which is a technique for grouping data while the number of clusters is not predefined. In the dbscan algorithm, a radius $\varepsilon$ defining neighboring space and the minimum number n of data points within the radius are defined as parameters, which are used to group data.

The hierarchical cluster analysis algorithm, the K-means algorithm, and the dbscan algorithm are well-known clustering technologies, so details of them will not be described herein.

The embodiment of the disclosure is focused on the silhouette score that is used for the debt management capability assessment system 100 to analyze performance of clustering results from the various algorithms, but the disclosure is not limited to using the silhouette score.

The silhouette score is a value that represents how similar data points are in a group compared to other groups, i.e., a measure of how similar a data point classified into a group is to its own group compared to other groups. The silhouette score ranges from −1 to +1, where a high value indicates that the data point is well matched to its own group and poorly matched to neighboring groups.

Based on the clustering performance analysis results, the debt management capability assessment system 100 selects the best of the various clustering algorithms used in the operation S400 to cluster users, in operation S600. For each data collected in the operation S100, information about a group to which the user is allocated, and a total debt value in the group are derived as results, in operation S700.

In this case, a user or administrator who uses the debt management capability assessment system 100 may hardly figure out characteristics of each group at a glance, because data sets collected by users allocated to each group are different. Accordingly, in the embodiment of the disclosure, characteristics giving positive or negative influences to the debt management capability for each group are derived, in operation S800. How to derive the characteristics of each group in the operation S800 will now be described in connection with FIG. 4.

Figure 4:
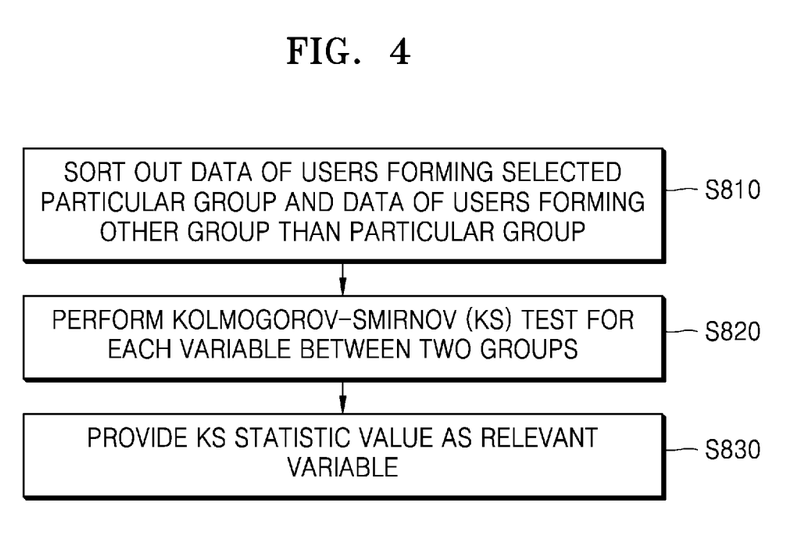
FIG. 4 is a flowchart illustrating a method of finding out characteristics in a group, according to an embodiment of the disclosure.

FIG. 4 is a flowchart illustrating a method of finding characteristics in a group, according to an embodiment of the disclosure.

Referring to FIG. 4, the debt management capability assessment system 100 may find out characteristics of one of a plurality of groups (hereinafter, referred to as a target group for convenience of explanation) by a test algorithm based comparison test on the target group and the other groups (hereinafter, referred to as a comparative group for convenience of explanation).

For this, the debt management capability assessment system 100 sorts out data sets of users forming the target group and data sets of users forming the comparative group, in operation S810. The debt management capability assessment system 100 applies the test algorithm to the data sets forming the two groups, in operation S820.

In the embodiment of the disclosure, for example, the Kolmogorov-Smirnov test algorithm is used as the test algorithm. The Kolmogorov-Smirnov test is an algorithm based on an empirical distribution function, that compares one or two samples using a cumulative distribution function. Specifically, the Kolmogorov-Smirnov test is an algorithm to assess suitability based on a principle that when two consecutive observations have the same cumulative distribution function, the probability density functions of the observations are the same as well.

Hence, in the embodiment of the disclosure, data sets in the target group and the comparative group are compared using the Kolmogorov-Smirnov test, which shows a statistically relevant value through analysis of each variable. The Kolmogorov-Smirnov test is an already-known test method, so the detailed description thereof will be omitted.

The debt management capability assessment system 100 provides statistics found by the Kolmogorov-Smirnov test as a relevant variable to the user, in operation S830.

An example of classifying users into groups in the debt management capability assessment system 100 will now be described in connection with FIG. 5.

Figure 5:
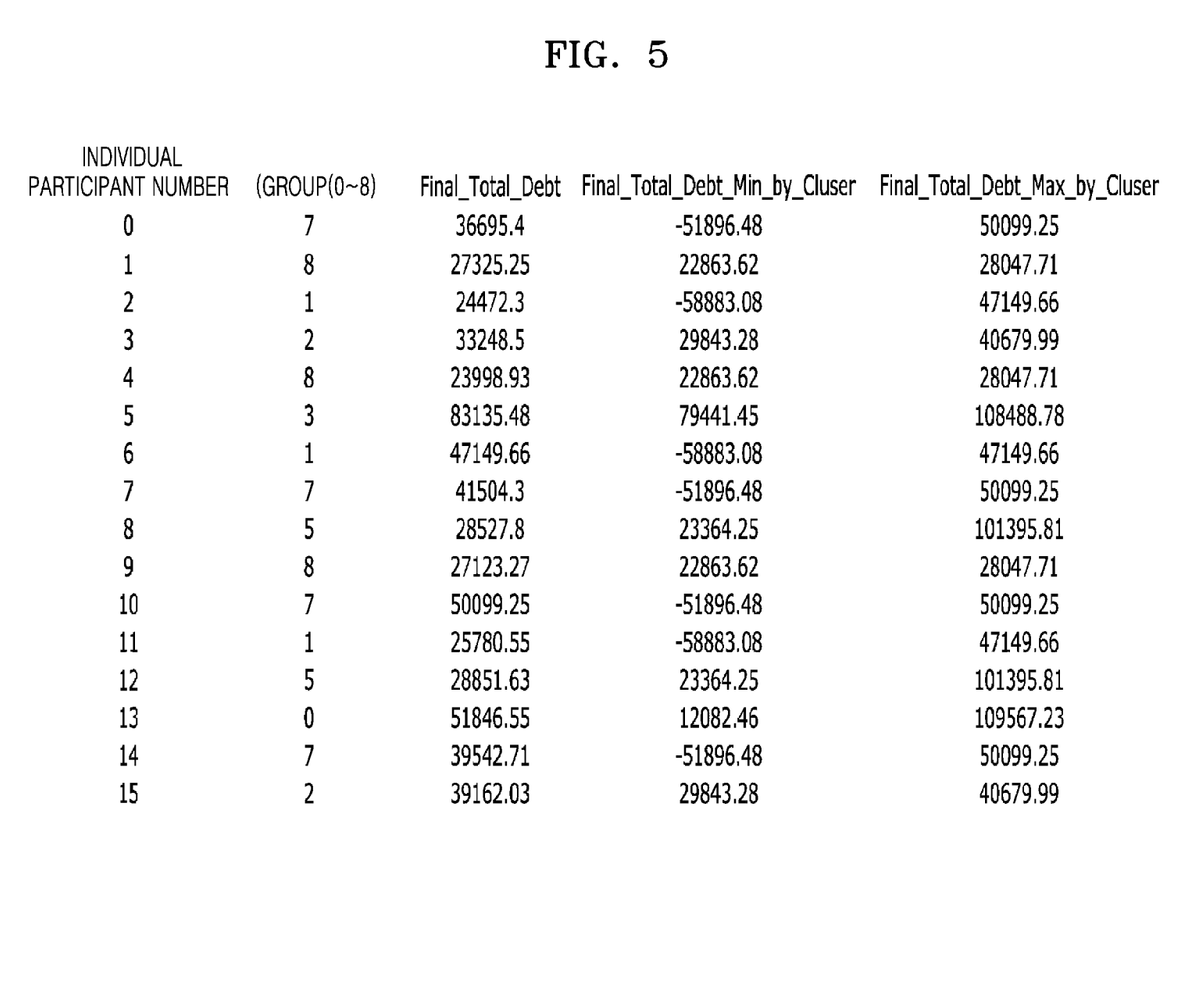
FIG. 5 illustrates data of users classified into groups, according to an embodiment of the disclosure.

FIG. 5 illustrates data of users classified into groups, according to an embodiment of the disclosure.

Referring to FIG. 5, data of users classified into groups (hereinafter, referred to as group data for convenience of explanation) includes user identification information, group identification information, final debt information of each user, final minimum debt information in the group (final total debt min by cluster), final maximum debt information in the group (final total debt max by cluster).

For example, a user with user identification information 0 and a user with user identification 7 are classified into the same group (with group identification information 7). Final debts of the user with user identification 0 and the user with user identification 7 are 36695.4 and 41504.3 (in a certain debt unit), respectively. A minimum debt and a maximum debt among users classified into group 7 are −51896.48 and 50099.25, respectively.

An example of priorities of variables extracted as relevant variables from among data sets collected by the debt management capability assessment system 100 will now be described in connection with FIG. 6.

Figure 6:
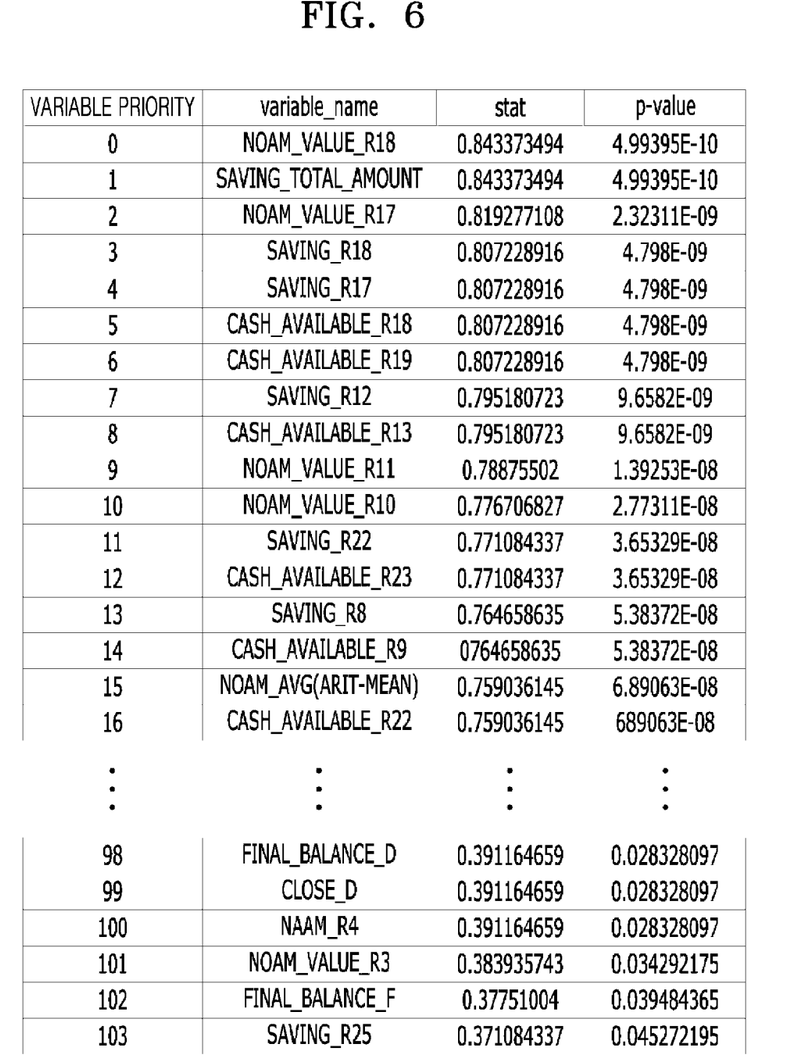
FIG. 6 illustrates priorities assigned to variables, according to an embodiment of the disclosure.

FIG. 6 illustrates priorities assigned to variables, according to an embodiment of the disclosure.

Assume that a user performed a debt management capability assessment test in 25 rounds. Referring to FIG. 6, the most important variable for group classification is 'NOAM' extracted in the 18-th round (NOA_VALUE_R18), which denotes an amount of money not allocated to a debt with the highest interest rate in the 18-th round. Of the variables, 'stat' denotes a statistical value.

'p-value' denotes a variable that has statistically the most relevant difference (p<0.05) among 126 variables in the group in question as compared to the same variable in other groups. This means that the distinguishing difference between the group in question and the other groups is shown by 'NOAM'.

The second most important variable is a total saving amount, and the third most important variable is NOAM extracted in the 17-th round.

A structure of the debt management capability assessment system 100 that operates as described above will now be described in connection with FIG. 7. The debt management capability assessment system 100, and the UE 200 may all be implemented in the form of a computing device 300, so the term debt management capability assessment system will be interchangeably used with the computing device 300 for convenience of explanation.

Figure 7:
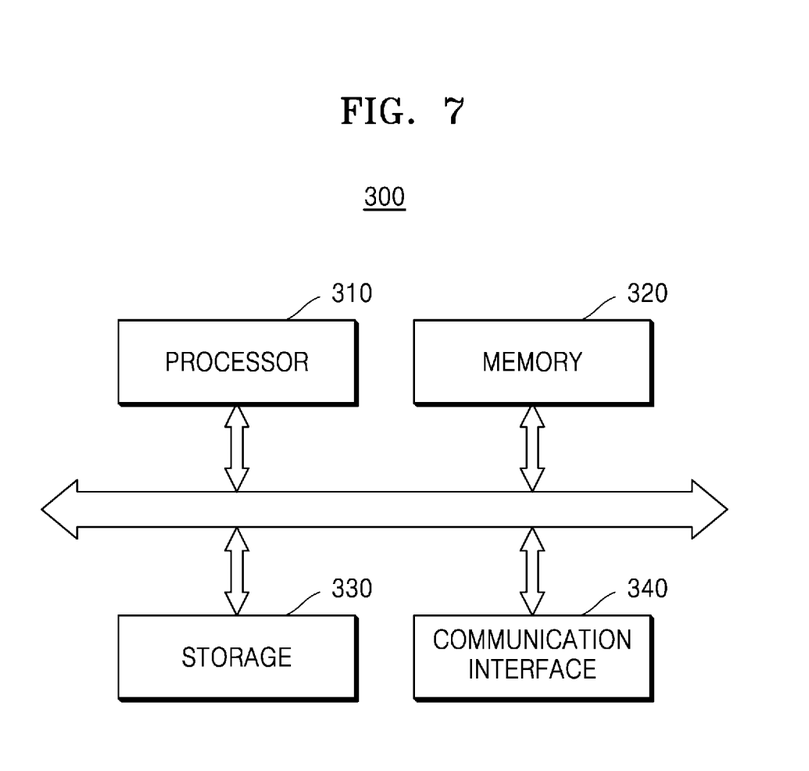
FIG. 7 is a block diagram of a computing device, according to an embodiment of the disclosure.

FIG. 7 is a block diagram of a computing device, according to an embodiment of the disclosure.

Referring to FIG. 7, the debt management capability assessment system is implemented in a computing device 300 that operates under the control of at least one processor by running a program including instructions composed to execute the operations as described above in the disclosure. The program may be stored or distributed in a computer-readable storage medium.

Hardware of the computing device 300 may include at least one processor 310, a memory 320, a storage 330, and a communication interface 340, which may be interconnected by a bus. In addition, hardware of an input device and an output device may further be included. The computing device 300 may be equipped with many different software including an operating system to run the program.

The processor 310 is a device for controlling operation of the computing device 300, which may be any type of processor for processing the instructions included in the program, e.g., a central processing unit (CPU), a micro processor unit (MPU), a micro controller unit (MCU), a graphic processing unit (GPU), etc.

The memory 320 loads the program for the processor 310 to process the instructions composed to perform the operation as described above in the disclosure. The memory 330 may be e.g., a read only memory (ROM), a random access memory (RAM), etc. The storage 330 may store many different data, programs, etc., required to perform the operation as described in the disclosure. The communication interface 340 may be a wired/wireless communication module.

According to the disclosure, a system for reinforcing a debt management capability may assess a debt management capacity of an individual or a member of a household.

Furthermore, education and solutions for reinforcing a debt management capability of an individual may be provided by providing educational contents required for the individual based on the individual's management capacity determined through a debt management capability level and assessment depending on the individual's management capability.

Several embodiments of the disclosure have been described, but it will be understood that various modifications can be made without departing the scope of the disclosure. Thus, it will be apparent to those of ordinary skill in the art that the disclosure is not limited to the embodiments described, but can encompass the appended claims and their equivalents.

What is claimed is:

1. A method of analyzing debt management capability information by a computing device working with a plurality of user equipments (UEs) and operating under the control of at least one processor, the method comprising:
   receiving debt repayment information for each round of a plurality of rounds from the plurality of UEs according to a debt assessment scenario set up with the plurality of rounds;
   determining a number of groups into which a plurality of users of the plurality of UEs are to be grouped, based on the debt repayment information;
   grouping the plurality of users into as many groups as the number of groups created based on the debt repayment information; and
   deriving characteristics of each of the groups based on first debt repayment information of first users constituting a target group that is one of the groups created based on debt management capability characteristics of the plurality of users and second debt repayment information of second users constituting comparative groups excluding the target group,
   wherein the characteristics of each of the groups is derived based on group data that include final debt information, final minimum debt information in the group and final maximum debt information in the group, and
   wherein the determining of the number of groups comprises:
   extracting object information to be analyzed from the debt repayment information, and
   determining the number of groups by clustering the extracted object information to be analyzed.

2. The method of claim 1, wherein the deriving of the characteristics of each group comprises:
   sorting out the first debt repayment information of the first users forming the target group and the second debt repayment information of the second users forming the comparative groups,
   performing a test algorithm for each of a plurality of variables included in each of the first debt repayment information and the second debt repayment information, and
   extracting a statistical value of a particular one of the plurality of variables.

3. The method of claim 2, wherein the extracting of the statistical value comprises
   determining a difference in distribution based on a histogram, and
   deriving characteristics of each group based on the extracted statistical value of the particular variable.

4. The method of claim 3, wherein the test algorithm comprises the Kolmogorov-Smirnov test algorithm.

5. The method of claim 4, wherein each debt repayment information comprises user identification information, debt identification information, debt information for each round, interest rate information for each debt, final balance information for each debt, final balance information for each debt at the end of a round, a final interest rate, and variables which are debt capacity assessment scores.

6. The method of claim 5, wherein the determining of the number of groups comprises
   determining the number of groups using the elbow method algorithm which looks for the number of clusters.

7. The method of claim 1, wherein the grouping comprises
   grouping the users into at least one group using a plurality of grouping algorithms, and
   analyzing grouping performance, and based on the analyzed performance, selecting one of the plurality of grouping algorithms as an algorithm for grouping,
   wherein the plurality of grouping algorithms include a hierarchical cluster analysis algorithm, a K-means cluster analysis algorithm, or a dbscan algorithm, and the grouping performance is analyzed based on silhouette scores.

8. A debt management capability assessment system comprising:
   a communication interface receiving debt repayment information for each round of a plurality of rounds from user equipments (UEs) participating in a debt assessment scenario set up with the plurality of rounds; and
   at least one processor,
   wherein the at least one processor is configured to:
   determine a number of groups into which a plurality of users of the UEs are to be grouped, based on the debt repayment information, group the plurality of users into as many groups as the number of groups created based on the debt repayment information, and derive characteristics of each of the groups based on first debt repayment information of first users constituting a target group that is one of the groups created based on debt management capability characteristics of the plurality of users and second debt repayment information of second users constituting comparative groups excluding the target group, and
   wherein the characteristics of each of the groups is derived based on group data that include final debt information, final minimum debt information in the group and final maximum debt information in the group, and
   wherein the at least one processor is further configured to extract object information to be analyzed from the debt repayment information, and determine the number of groups by clustering the extracted object information to be analyzed.

9. The debt management capability assessment system of claim 8, wherein the at least one processor is further configured to:
   sort out the first debt repayment information of the first users forming the target group and the second debt repayment information of the second users forming the comparative groups and perform a test algorithm for each of a plurality of variables included in each of the first debt repayment information and the second debt repayment information.

10. The debt management capability assessment system of claim 9, wherein the at least one processor is further configured to:
    extract statistics of particular ones of the plurality of variables and derive characteristics of each group based on the extracted statistics of the particular variables.

11. The debt management capability assessment system of claim 8, wherein the at least one processor is further configured to determine the number of groups using the elbow method algorithm.

\* \* \* \* \*